United States Patent
Hoffmann et al.

(10) Patent No.: US 9,297,126 B2
(45) Date of Patent: Mar. 29, 2016

(54) TRAFFIC MONITORING APPARATUS

(71) Applicant: VITRONIC Dr.-Ing. Stein Bildverarbeitungssysteme GmbH, Wiesbaden (DE)

(72) Inventors: Burghard Hoffmann, Taunusstein (DE); Reiner Bobak, Hünstetten (DE)

(73) Assignee: VITRONIC Dr.-Ing. Stein Bildverarbeitungssysteme GmbH, Wiesbaden (DE)

( * ) Notice: Subject to any disclaimer, the term of this patent is extended or adjusted under 35 U.S.C. 154(b) by 0 days.

(21) Appl. No.: 14/317,168

(22) Filed: Jun. 27, 2014

(65) Prior Publication Data
US 2015/0003908 A1 Jan. 1, 2015

(30) Foreign Application Priority Data

Jun. 27, 2013 (EP) .................................... 13174138

(51) Int. Cl.
| | |
|---|---|
| *E01F 11/00* | (2006.01) |
| *G03B 17/02* | (2006.01) |
| *G03B 17/08* | (2006.01) |
| *G08G 1/00* | (2006.01) |
| *G03B 17/55* | (2006.01) |
| *G08G 1/017* | (2006.01) |
| *G08G 1/054* | (2006.01) |

(52) U.S. Cl.
CPC ............... *E01F 11/00* (2013.01); *G03B 17/02* (2013.01); *G03B 17/08* (2013.01); *G03B 17/55* (2013.01); *G08G 1/00* (2013.01); *G08G 1/0175* (2013.01); *G08G 1/054* (2013.01)

(58) Field of Classification Search
CPC ....... E01F 9/0175; E01F 9/0111; E01F 15/00; E01F 15/088; E01F 15/146; E01F 15/08
USPC ..................................................... 404/6, 9, 10
See application file for complete search history.

(56) References Cited

U.S. PATENT DOCUMENTS

| | | | | |
|---|---|---|---|---|
| 1,643,955 | A * | 10/1927 | Rank et al. ....................... | 40/608 |
| 3,631,789 | A * | 1/1972 | Kinsey ............................. | 454/47 |
| 4,354,772 | A * | 10/1982 | Drexler ........................... | 404/10 |
| 4,414,576 | A | 11/1983 | Randmae | |
| 4,596,489 | A * | 6/1986 | Mariol et al. ................... | 404/10 |
| 5,335,471 | A * | 8/1994 | Kupiec ............................. | 52/834 |
| 5,864,365 | A | 1/1999 | Sramek et al. | |
| 7,243,473 | B2 * | 7/2007 | Terrels ............................. | 52/843 |
| 7,273,328 | B2 * | 9/2007 | Hunter et al. ................... | 404/12 |
| 7,287,929 | B1 * | 10/2007 | Sokolowski et al. ............. | 404/6 |
| 7,828,486 | B1 * | 11/2010 | Wong ............................. | 396/427 |
| 7,992,362 | B2 * | 8/2011 | Petta ............................... | 52/848 |
| 8,443,576 | B2 * | 5/2013 | Petta ............................... | 52/835 |
| 2004/0139812 | A1 | 7/2004 | Erel et al. | |
| 2005/0248922 | A1 * | 11/2005 | Chu et al. ....................... | 361/700 |
| 2006/0115265 | A1 | 6/2006 | Elberbaum | |
| 2014/0301070 | A1 * | 10/2014 | Oostdyk et al. ................ | 362/231 |

FOREIGN PATENT DOCUMENTS

DE 4400475 C1 12/1994

* cited by examiner

*Primary Examiner* — Abigail A Risic
(74) *Attorney, Agent, or Firm* — Dinsmore & Shohl LLP

(57) ABSTRACT

Traffic monitoring apparatus with a housing 1, which has several longitudinal profiles 2, 3, 4, 5, which are aligned parallel to a vertical axis H and which are arranged circumferentially around the vertical axis H and enclose an inner housing chamber 18, wherein at least one of the longitudinal profiles 2, 3, 4, 5 has an outer wall 6, forming the outer face 8, and an inner wall 7, forming the inner face 9, facing to the inner housing chamber 18.

15 Claims, 3 Drawing Sheets

TRAFFIC MONITORING APPARATUS

CROSS-REFERENCE TO RELATED APPLICATIONS

This application claims priority of European Patent Application No. 13174138.1 filed Jun. 27, 2013, the contents of which are incorporated herein by reference.

FIELD OF THE INVENTION

The invention relates to a traffic monitoring apparatus with a housing, in which the necessary electronic devices are accommodated for the traffic monitoring, like devices for determining the speed of vehicles and cameras.

BACKGROUND OF THE INVENTION

Generally stationary as well as mobile traffic monitoring apparatuses are known, which have a box-shaped housing. This has generally a frame, on which metal sheets are mounted, so that an inner housing chamber is enclosed by the metal sheets. In other variants metal sheet elements are used, which are welded to each other or are also partially bent. However, these constructions have the disadvantage, that they are cumbersome concerning their manufacture and assembly.

The object of the present invention is, to provide a traffic monitoring apparatus with a simply structured housing.

SUMMARY OF THE INVENTION

The object of the present invention is, to provide a traffic monitoring apparatus with a simply structured housing.

The object is met by a traffic monitoring apparatus with a housing, wherein the housing has several longitudinal profiles, aligned parallel to a vertical axis and which are arranged circumferentially around the vertical axis and enclose an inner housing chamber, wherein at least one of the longitudinal profiles has an outer wall forming an outer face and an inner wall forming an inner face.

The structure of the at least one longitudinal profile such, that the outer face and the inner face can be formed by different elements of the longitudinal profile, namely the outer wall and the inner wall, has the advantage, that the outer face can be formed independently of the functional requirements of the inner face. The necessary electronic devices can be mounted on the inner face. In this case, special shapes and adaptations of the inner face are necessary, to ensure a simple assembly of the devices. However, it can be desired, to form the outer face independently of this function requirement. This is achieved such, that the outer wall does not form the inner face and, thus, can freely be designed. A further advantage is, that in this double-walled structure an increased stability of the longitudinal profile is achieved, so that a self-supporting structure, which does not require a frame structure, can be achieved. Already by means of the assembly of the individual longitudinal profiles to each other, the necessary stability can be achieved. A further advantageous aspect is, that during solar radiation this strikes the outer wall and only the outer wall is directly heated. Because of the inner wall, this radiation heat is not directly transmitted to the inside of the housing. Furthermore, the separate outer wall offers the possibility, to provide special provisions against vandalism, wherein already the provision of an outer wall leads to the fact, that during a damage of the outer wall, the inside of the housing is still protected.

Advantageously, all longitudinal profiles of the housing are identical concerning their cross-sectional outline. Thus, the component diversity for manufacturing the housing is visibly reduced. The individual identical longitudinal profiles can still be subsequently processed, to accommodate different functions, like for example openings for cameras and sensors or cooling channels.

For a simple assembly of the electronic devices, the inner face of the inner wall of the at least one longitudinal profile has a flat face facing the inner housing chamber. On this flat face, common electronic devices, like for example cameras, computer units or similar, can be mounted in a simple manner. Generally, the whole inner face can be formed as a flat face.

The at least one longitudinal profile can be formed as a hollow profile. Thus, a very stable basic shape is achieved, which offers additionally thermal advantages during direct sun radiation. Advantageously, the longitudinal profiles can be extrusion moulded or extruded, so that it offers an especially advantageous manufacture of the longitudinal profiles.

The at least one longitudinal profile can have at least one cooling channel for conveying a cooling medium, preferably air. The cooling channel is preferably formed directly between the inner wall and the outer wall, wherein the inner wall and outer wall delimit the cooling channel. In this case, the design of the longitudinal profile as a hollow profile is especially advantageous, so that no further separate walls have to be provided for forming the cooling channel.

Two cooling channels can be formed between the outer wall and the inner wall, wherein the two cooling channels are separated from each other by a separation wall. The separation wall has, in this case preferably structures enlarging the surface, like for example gills, which enhance the heat exchange between the two cooling channels. The separation wall can be an integral component of the longitudinal profile or can be formed as a separate component, which is inserted into the longitudinal profile between the outer wall and the inner wall and is sealingly connected to the longitudinal profile.

The longitudinal profiles are preferably detachably connected to each other, to ensure a simple assembly and disassembly on-site. Preferably, it is provided, that the outer faces of the longitudinal profiles form together a closed outer face of the housing in circumferential direction, wherein the individual outer faces of the longitudinal profiles have a continuous transition to each other, i.e. merge without significant edge or corner.

It can be provided, that the housing is protected against the ingress of foreign particles, dust and/or liquids, especially water, to achieve for example a protection according to DIN EN 60529. For this, the housing is completely encapsulated or sealed to the outside. Thus, the individually required electronic devices do not themselves have to be encapsulated and do not themselves need to have a protection according to DIN EN 60529.

To achieve this, seals can be arranged between the individual longitudinal profiles. The longitudinal profiles have, in this case, outer edges extending parallel to the vertical axis. Each pair of said neighbouring longitudinal profiles about each other with said edges, wherein seals are provided between the longitudinal edges of two neighbouring longitudinal profiles, to seal the inner housing chamber to the outside.

To ensure accessibility of the inner housing chamber, one of the longitudinal profiles can be connected via hinges to a neighbouring one of the longitudinal profiles. Thus, the whole longitudinal profile serves as a door.

The inner housing chamber of the housing serves to accommodate electronic devices for the traffic monitoring. In this case, at least one of the longitudinal profiles can have at least one opening for a camera, a LIDAR-system, sensors or illumination units for the traffic monitoring.

DETAILED DESCRIPTION OF THE PREFERRED EMBODIMENT

Figure 1:
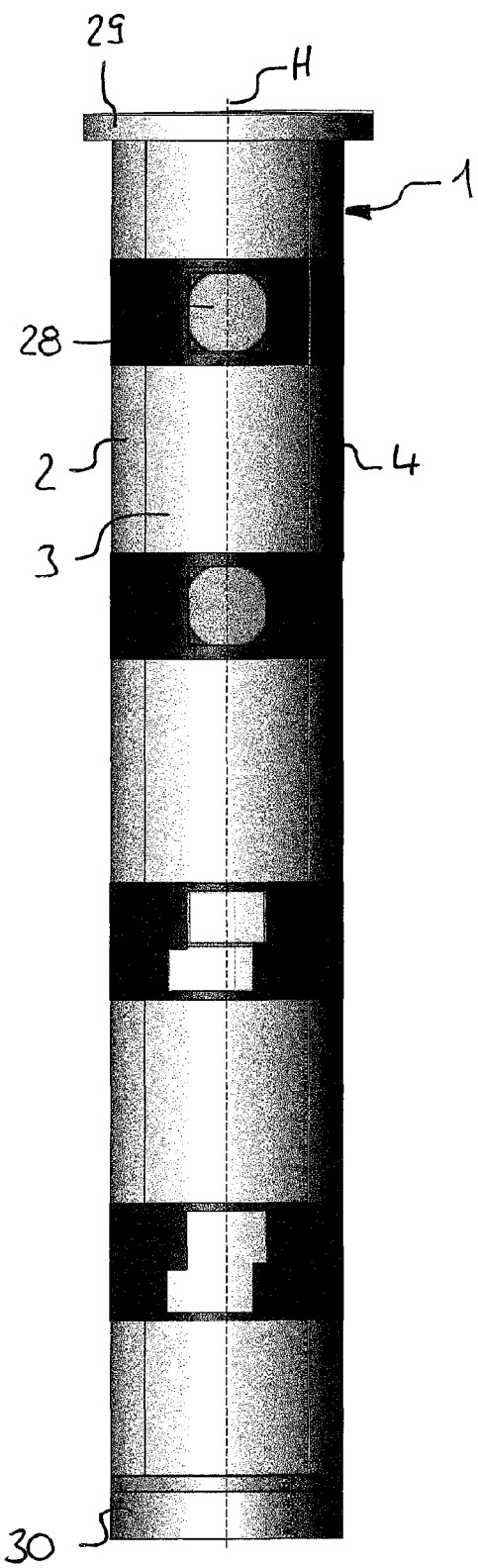
FIG. 1 is a front view of a traffic monitoring apparatus.
Figure 2:
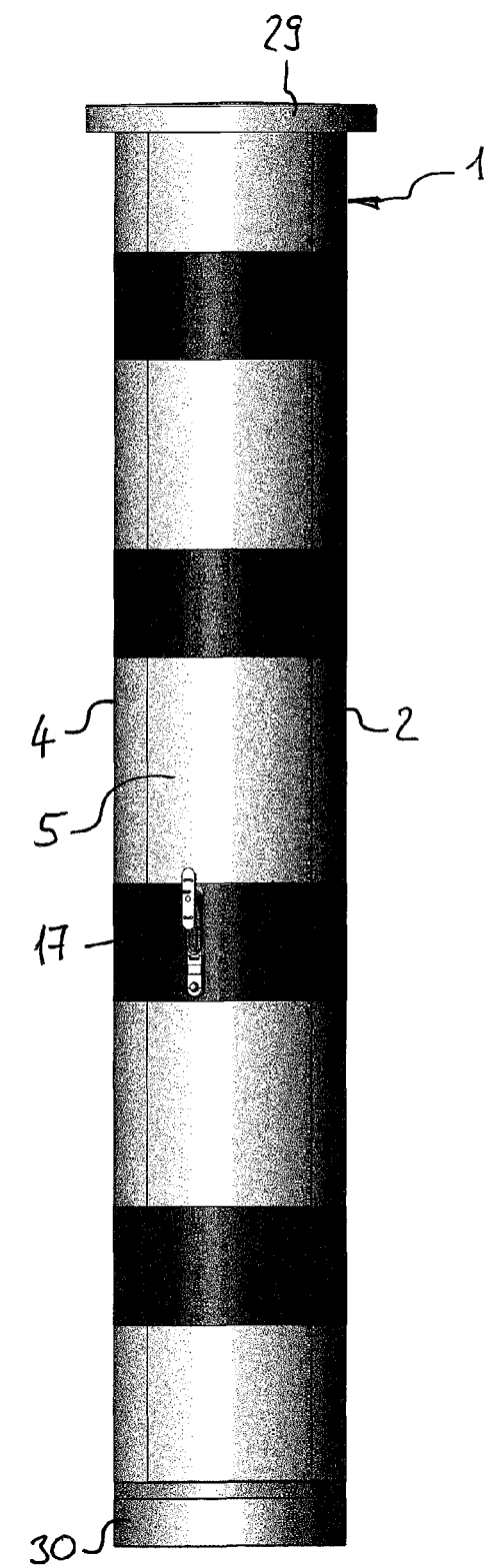
FIG. 2 is a rear view of the traffic monitoring apparatus of FIG. 1.

FIGS. 1 to 5 show the same traffic monitoring apparatus in different views and are described together in the following.

The traffic monitoring apparatus has a housing 1, which is essentially constructed from four longitudinal profiles 2, 3, 4, 5. The longitudinal profiles 2, 3, 4, 5 are arranged parallel to a vertical axis H of the housing 1 and are arranged around the vertical axis H such, that, when seen in cross-section, a closed housing 1 is achieved, which forms an inner housing chamber 18. The cross-sectional profile of all longitudinal profiles 2, 3, 4, 5 is identical, wherein in the following the longitudinal profile with the reference numeral 5 is described exemplary for all longitudinal profiles 2, 3, 4, 5. The longitudinal profile 5 is formed as a hollow profile and has an outer wall 6 and an inner wall 7. In principle, the longitudinal profile 5 does not have to be formed as a hollow profile, as long as it has an inner wall and an outer wall. The outer wall 6 has an outer face 8, facing outward, and the inner wall 7 has an inner face 9, facing inward. All outer walls 8 of the four longitudinal profiles 2, 3, 4, 5 form together the outer face of the housing 1. All inner faces 9 of the profiles 2, 3, 4, 5 form together the inner face of the inner housing chamber 18. The cross-sectional outline (FIG. 5) of the longitudinal profile 5 has the form of a segment of a circle, wherein the outer wall 6 extends along an arc of a circle and the inner wall 7 extends along a chord, wherein the outer wall 6 is arranged centrally to the vertical axis H. Thus, all outer walls 6 of the longitudinal profiles 2, 3, 4, 5 form a common outer wall or form an outer face of the housing 1, which is circular when seen in cross-section. Generally, the outer wall 6 can have any shape. The circular shape has, however, the advantage, that all longitudinal profiles 2, 3, 4, 5 can have an identical profile, when seen in cross-section.

The inner wall 7 extends along a chord and is formed flat, so that the inner face 9 as a whole has the shape of a flat surface. Thus, an inner housing chamber 19 with a quadratic cross-section is achieved. The outer wall 6 and the inner wall 7 abut each other at two longitudinal edges 10, 11. Respectively, two neighbouring longitudinal profiles 2, 3, 4, 5 abut with their longitudinal edges 10, 11 each other, wherein a seal 12 in form of a sealing strip is provided between two neighbouring longitudinal edges or longitudinal edges which abut each other. Thus, the longitudinal profiles 2, 3, 4, 5 are sealed against each other and seal the inner housing chamber 18 to the outside.

Any components can be attached on the inner walls 7, because of the quadratic cross-section of the inner housing chamber 18. Connection angles 14 are provided for connecting the individual neighbouring longitudinal profiles 2, 3, 4, 5 to each other. Attachment grooves 15 are formed parallel to the vertical axis H in the inner walls 7, which attachment grooves form an undercut or are provided in the shape of a dovetail guide. Threaded pieces (not shown) with internal thread can be pushed into these grooves, so that screws can be screwed through bores of the connection angels 14 into the threaded pieces, to connect the connection angles 14 to the longitudinal profiles 2, 3, 4, 5 and, thus, to connect two neighbouring longitudinal profiles 2, 3, 4, 5 to each other across the corner. The attachment grooves 15 can further serve to attach electronic apparatuses for the traffic monitoring apparatus to the inner walls 7. Furthermore, hinges 16 are attached at one of the longitudinal profiles, namely the longitudinal profile with the reference numeral 5, at one of the attachment grooves 15, which, furthermore, are mounted on a neighbouring longitudinal profile 2, so that the total longitudinal profile with reference numeral 5 can serve as a door. For this, a door handle 17 is arranged in the outer wall 6.

Furthermore, the longitudinal profiles 2, 3, 4, 5 serve for cooling the inner housing chamber 18. For this, the longitudinal profile 5, which also serves as a door, as already mentioned, is formed as a hollow profile and, thus, forms between the outer wall 6 and the inner wall 7 a cooling channel 13, through which a cooling medium, air in this case, can be conveyed. The longitudinal profiles with reference numerals 2 and 4, which abut the longitudinal profile with reference numeral 5, are, as already said, formed identical to the longitudinal profile 5. However, these longitudinal profiles 2, 4 are separated into an outer cooling channel 19 and an inner cooling channel 20. For this, a separation wall 21 is inserted into the inner of the longitudinal profiles 2, 4 and is attached in a sealed manner parallel to the longitudinal edges of the respective longitudinal profiles 2, 4. In the shown embodiment, the separation wall 21 is connected at the rear side of the wall portions with the longitudinal profiles 2, 4, forming the attachment grooves 15. Thus, the outer cooling channel 19 is formed between the separation wall 21 and the outer wall 6. The inner cooling channel 20 is formed between the separation wall 21 and the inner wall 7. Ambient air is conveyed into the outer cooling channel 10, as described in the following in more detail. Air flows from the inner housing chamber 18 into the inner cooling channel 20, wherein the two cooling systems of the outer cooling channel 19 and of the inner cooling channel 20 are sealed against each other. For improving the heat exchange between the two cooling systems 19, 20, the separation wall has outer gills or fins 22 in the outer cooling channel 19 and inner gills or fins 23 in the inner cooling channel 20, by means of which the surface of the separation wall 21 is enlarged, to enhance a heat transfer between the two cooling channels 19, 20.

A front longitudinal profile with the reference numeral 3 is provided with openings for cameras, LIDAR-systems ("Light Detection and Ranging"-system by using a laser) or further sensors. For this, openings 24 are provided in the inner wall 7 and openings 25 are provided in the outer wall 6, in which transparent components 28 with transparent panes 26, 27 are provided. The transparent components 28 are inserted into the openings 24, 25 in a sealed manner.

By means of the sealed connection of the longitudinal profiles 2, 3, 4, 5 to each other and the sealed insertion of the transparent components 28 it is ensured, that the inner housing chamber 18 is protected against the ingress of foreign particles, dust and/or liquids, so that the electronic components, which are accommodated in the inner housing chamber 19, do not have to be encapsulated themselves.

The housing 11 is closed at the top by a lid 29 and at the bottom by a foundation 30.

Figure 3:
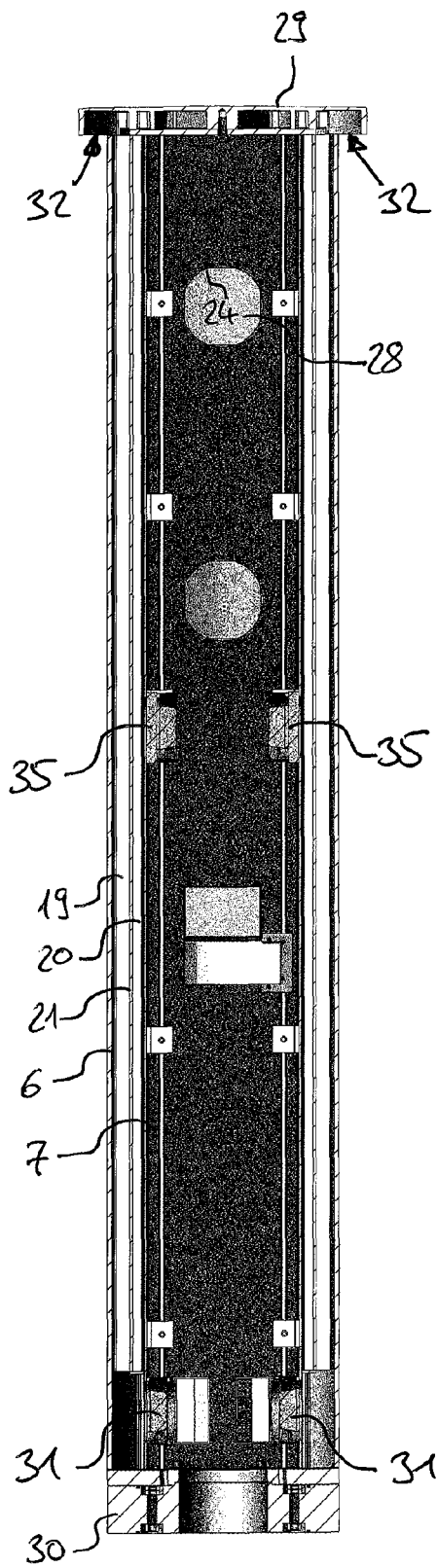
FIG. 3 is a longitudinal sectional view through a traffic monitoring apparatus of FIG. 1 along the section line in FIG. 5.
Figure 4:
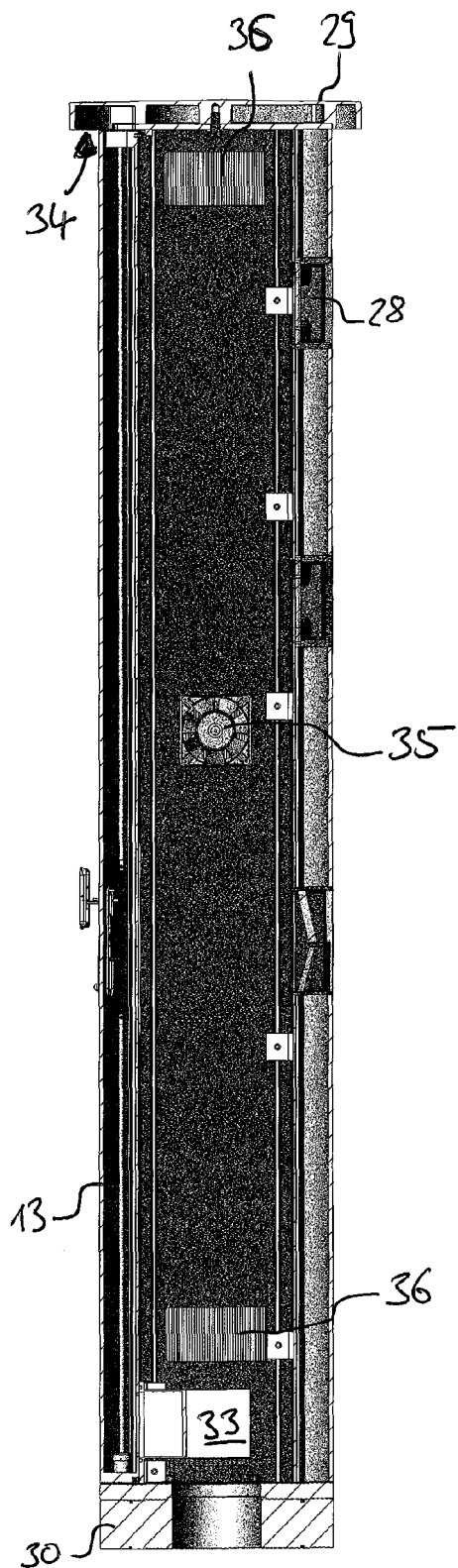
FIG. 4 is a longitudinal sectional view through a traffic monitoring apparatus of FIG. 1 along the section line IV-IV in FIG. 5
Figure 5:
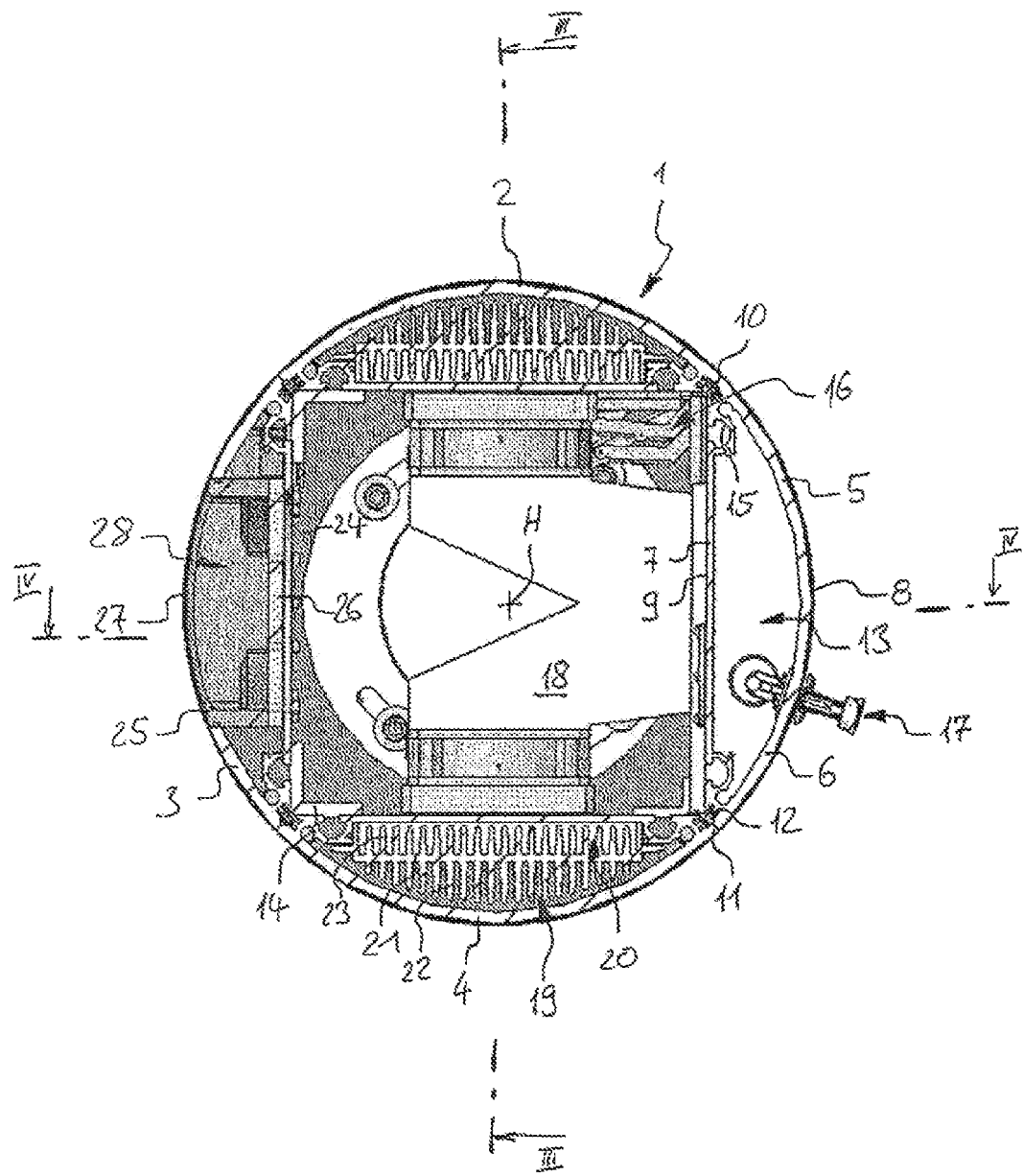
FIG. 5 is a cross-sectional view through the traffic monitoring apparatus of FIG. 1 along the section line V-V in FIG. 1.

In FIGS. 3 and 4 the cooling circuits are visible. FIG. 3 shows the inner and outer cooling channels 19, 20 in a longitudinal sectional view. The outer cooling channel 19 of the two longitudinal profiles 2, 4 is connected at the upper end of the longitudinal profiles 2, 4 to an air inlet opening in the lid 29. The inner cooling channels 20 are closed at the upper end by the lid 29. At the lower end of the longitudinal profiles 2, 4 it is visible, that the separation wall 21 ends in front of the lower end of the longitudinal profiles 2, 4 and the inner cooling channels 20 are closed downwards. The outer cooling channels 19 extend further downwards, wherein in this area respectively a blower 31 is provided in the inner walls 7 of the profiles 2, 4. By means of the blower 31 air is sucked through the inlet openings 32, is conveyed vertically along the outer cooling channels 19 downwards and is, then, conveyed through the blower 31 through the connection channels 33 in the cooling channel 14 of the longitudinal profile with the reference numeral 5, which also serves as a door. The air is delivered through the cooling channel 13 of the longitudinal profile 5 upwards and is expelled through an outlet opening of the lid 29. In this case, it is ensured, that the sucked-in ambient air does not enter the inner of the inner housing chamber 18.

Approximately in the centre area of the profiles 2, 4, a blower 35 is provided in the inner walls, which sucks air from the inner housing chamber 19 and conveys the air into the inner cooling channels 20 of the profiles 2, 4. The air is, then, transported upwards and downwards and is blown through the exiting openings 36 at the upper and lower end of the profiles 2, 4 back again into the inner housing chamber 18.

A heat exchange takes place via the separation walls 21 between the sucked-in ambient air and the circulating internal air of the inner housing chamber 19, so that the heat, produced by the electronic devices within the inner housing chamber 18, can be emitted to the outside. In this case, a complete separation of the air circuits is ensured, so that no dust or similar can enter the inner housing chamber 18.

REFERENCE NUMERALS LIST 1 housing
2 longitudinal profile
3 longitudinal profile
4 longitudinal profile
5 longitudinal profile
6 outer wall
7 inner wall
8 outer face
9 inner face
10 longitudinal edge
11 longitudinal edge
12 seal
13 cooling channel
14 connection angle
15 attachment groove
16 hinge
17 door handle
18 inner housing chamber
19 outer cooling channel
20 inner cooling channel
21 separation wall
22 outer gill
23 inner gill
24 opening
25 opening
26 pane
27 pane
28 transparent component
29 lid
30 foundation
31 blower
32 inlet opening
33 connection channel
34 outlet opening
35 blower
36 exiting opening
H vertical axis

We claim:

1. A traffic monitoring apparatus comprising:
a housing, which has several longitudinal profiles, aligned parallel to a vertical axis and which are arranged circumferentially around the vertical axis and enclose an inner housing chamber,
wherein at least one of the longitudinal profiles has an outer wall, which forms an outer face, and an inner wall, which forms an inner face facing to the inner housing chamber, at least one cooling channel for conveying a cooling medium, the at least one cooling channel formed between the inner wall and the outer wall of the at least one longitudinal profile.

2. The traffic monitoring apparatus according to claim 1 wherein that the inner face of the inner wall of the at least one longitudinal profile has a flat face facing the inner housing chamber.

3. The traffic monitoring apparatus according to claim 1 wherein that the at least one longitudinal profile is a hollow profile.

4. The traffic monitoring apparatus according to claim 1 wherein that the longitudinal profiles are extrusion moulded or extruded.

5. The traffic monitoring apparatus according to claim 1, wherein that two cooling channels, which are separated from each other by a separation wall, are formed between the outer wall and the inner wall.

6. The traffic monitoring apparatus according to claim 5, wherein that the separation wall has gills.

7. The traffic monitoring apparatus according to claim 6, wherein that the separation wall is formed as a separate component and is inserted into the longitudinal profile between the outer wall and the inner wall.

8. The traffic monitoring apparatus according to claim 1 wherein that the housing is protected against the ingress of foreign particles, dust and/or liquids.

9. The traffic monitoring apparatus according to claim 1 wherein that the longitudinal profiles are detachably connected to each other.

10. The traffic monitoring apparatus according to claim 1 wherein that the outer faces of the longitudinal profiles form together a closed outer face of the housing in circumferential direction, wherein the individual outer faces of the longitudinal profiles have a continuous transition to each other.

11. The traffic monitoring apparatus according to claim 1 further comprising:
that each of the longitudinal profiles has outer edges extending parallel to the vertical axis and
that each pair of neighbouring longitudinal profiles about each other with said outer edges; and
wherein seals are provided between the longitudinal edges of each pair of neighbouring longitudinal profiles to seal the inner housing chamber to the outside.

12. The traffic monitoring apparatus according to claim 1 wherein that one of the longitudinal profiles is connected via hinges to a neighbouring one of the longitudinal profiles.

13. The traffic monitoring apparatus according to claim 1 wherein that the housing, formed by the longitudinal profiles, is self-supporting.

14. The traffic monitoring apparatus according to claim 1 wherein that electronic devices for the traffic monitoring are accommodated in the inner housing chamber of the housing.

15. The traffic monitoring apparatus according to claim 1 wherein that at least one of the longitudinal profiles is provided with at least one opening for a camera, a LIDAR-system or sensors for the traffic monitoring.

* * * * *